United States Patent
Cappiello et al.

(10) Patent No.: US 7,113,993 B1
(45) Date of Patent: Sep. 26, 2006

(54) TECHNIQUE FOR HANDLING SERVER SESSION REQUESTS IN A SYSTEM HAVING A PLURALITY OF SERVERS

(75) Inventors: Scott Cappiello, Arlington, VA (US); Yi Du, Vienna, VA (US); Dyung V. Le, Rockville, MD (US); Benjamin Z. Li, Great Falls, VA (US); Wenfeng Li, Reston, VA (US); Ramprasad Polana, Sterling, VA (US); Patrick Vinton, Alexandria, VA (US)

(73) Assignee: MicroStrategy, Inc., McLean, VA (US)

( * ) Notice: Subject to any disclaimer, the term of this patent is extended or adjusted under 35 U.S.C. 154(b) by 171 days.

(21) Appl. No.: 10/162,716

(22) Filed: Jun. 6, 2002
(Under 37 CFR 1.47)

Related U.S. Application Data

(63) Continuation of application No. 10/043,264, filed on Jan. 14, 2002, now abandoned, which is a continuation of application No. 09/884,469, filed on Jun. 20, 2001, now abandoned.

(51) Int. Cl.
*G06F 15/16* (2006.01)
(52) U.S. Cl. .................................................... 709/227
(58) Field of Classification Search ........... 709/227, 709/228, 203; 718/105; 714/4
See application file for complete search history.

(56) References Cited

U.S. PATENT DOCUMENTS

| | | |
|---|---|---|
| 4,688,195 A | 8/1987 | Thompson |
| 4,829,423 A | 5/1989 | Tennant |
| 4,876,643 A | 10/1989 | McNeill et al. |
| 5,197,005 A | 3/1993 | Shwartz |
| 5,276,870 A | 1/1994 | Shan |
| 5,418,943 A | 5/1995 | Borgida |
| 5,421,008 A | 5/1995 | Banning |
| 5,555,403 A | 9/1996 | Cambot |
| 5,584,024 A | 12/1996 | Shwartz |
| 5,664,182 A | 9/1997 | Nierenberg |
| 5,692,181 A | 11/1997 | Anand |
| 5,754,752 A * | 5/1998 | Sheh et al. ............... 714/4 |
| 5,864,856 A | 1/1999 | Young |
| 5,914,878 A | 6/1999 | Yamamoto |
| 5,938,732 A * | 8/1999 | Lim et al. ............... 709/229 |
| 6,058,424 A * | 5/2000 | Dixon et al. ........... 709/226 |

(Continued)

OTHER PUBLICATIONS

Robert C. Stern, Bruce M. Anderson and Craig W. Thompson, A Menu-Based Natural Langauage Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

(Continued)

*Primary Examiner*—David Wiley
*Assistant Examiner*—Joseph Maniwang
(74) *Attorney, Agent, or Firm*—Hunton & Williams LLP

(57) ABSTRACT

A technique for handling server session requests in a system having a plurality of servers is disclosed. In one embodiment, the technique includes receiving a request to create a session on one of the plurality of servers. In response to the request, a primary session is created on a first of the plurality of servers. After the primary session is created, at least one other of the plurality of servers are notified that the primary session has been created. Such notification allows for a backup session on the at least one other of the plurality of servers to take over for the primary session upon a failure on the first of the plurality of servers.

25 Claims, 3 Drawing Sheets

U.S. PATENT DOCUMENTS

| | | | |
|---|---|---|---|
| 6,078,960 A * | 6/2000 | Ballard | 709/229 |
| 6,128,642 A * | 10/2000 | Doraswamy et al. | 709/201 |
| 6,154,766 A | 11/2000 | Yost | |
| 6,247,008 B1 | 6/2001 | Cambot et al. | |
| 6,279,033 B1 | 8/2001 | Selvarajan et al. | |
| 6,490,610 B1 * | 12/2002 | Rizvi et al. | 718/101 |
| 6,539,494 B1 * | 3/2003 | Abramson et al. | 714/4 |
| 6,560,717 B1 * | 5/2003 | Scott et al. | 714/4 |
| 6,601,101 B1 * | 7/2003 | Lee et al. | 709/227 |
| 6,675,199 B1 * | 1/2004 | Mohammed et al. | 709/208 |
| 2002/0019873 A1 * | 2/2002 | Goldszmidt et al. | 709/228 |
| 2002/0040400 A1 * | 4/2002 | Masters | 709/228 |
| 2002/0078209 A1 * | 6/2002 | Peng | 709/227 |
| 2002/0099829 A1 * | 7/2002 | Richards et al. | 709/227 |
| 2002/0152429 A1 * | 10/2002 | Bergsten et al. | 714/43 |
| 2002/0161802 A1 * | 10/2002 | Gabrick et al. | 707/517 |
| 2003/0014526 A1 * | 1/2003 | Pullara et al. | 709/227 |
| 2003/0023669 A1 * | 1/2003 | DeLima et al. | 709/203 |

OTHER PUBLICATIONS

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun., 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth M. Ross, A Toolkit for Building, "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of the Graduate School of The University of Texas at Austin, May 1984.

GIS/LIS'88 Proceedings accessing the world, vol. 2 pp. 741-750.

Business Objects User's Guide Version 5.1 (electronic copy on enclosed CD).

Getting Started with Business Objects Version 5.1 (electronic copy on enclosed CD).

Business Objects Deployment Guide (electronic copy on enclosed CD).

Broadcast Agent 5.1 (electronic copy on enclosed CD).

Business Objects 5.1 (electronic copy on enclosed CD).

Web Intelligence 2.6 (electronic copy on enclosed CD).

Business Objects Designer's Guide Version 5.1 (electronic copy on enclosed CD).

Business Objects Error Message Guide Version 5.1 (electronic copy on enclosed CD).

Business Objects Generic ODBC Access Guide Version 5.1 (electronic copy on enclosed CD).

Business Objects Info View User's Guide (electronic copy on enclosed CD).

Business Objects Installation and Upgrade Guide (electronic copy on enclosed CD).

Business Objects MS Access Database Guide Version 5.1 (electronic copy on enclosed CD).

Business Objects MS SQL Server Database Guide Version 5.1 (electronic copy on enclosed CD).

Business Objections Supervisor's Guide Version 5.1 (electronic copy on enclosed CD).

Quick Start MicroStrategy Agent Version 6.0 (electronic copy on enclosed CD).

User Guide MicroStrategy Agent Version 6.0 (electronic copy on enclosed CD).

User Guide MicroStrategy Architect Version 6.0 (electronic copy on enclosed CD).

User Guide MicroStrategy Objects Version 6.0 (electronic copy on enclosed CD).

Excel Add-In MicroStrategy Objects Verison 6.0 (electronic copy on enclosed CD).

User Guide MicroStrategy Intelligence Server Version 6.0 (electronic copy on enclosed CD).

User Guide MicroStrategy Administrator Version 6.0 (electronic copy on enclosed CD).

Administrator Guide MicroStrategy Administator Verison 6.5 (electronic copy on enclosed CD).

Alan Robertson, Linux—HA Heartbeat System Design, Proceedings of the 4th Annual Linux Showcase & Conferences, Atlanta, Oct. 10-14, 2000, 12 pages.

Trevor Schroeder, Steve Goddard, Byrav Ramamurthy, Scalable Web Server Clustering Technologies, May/Jun. 2000, University of Nebraska-Lincoln, p. 38-45.

Eric Levy-Abegnoli, Arun Iyengar, Junehwa Soong, Daniel Dias, Design and Performance of a Web Server Accelerator, T.J. Watson Research Center, Yorktown Heights, NY, Jun. 99, 9 pages.

P. Srisuresh, D. Gan, Load Sharing using IP Network Address Translation, Juniper Networks, Inc., Aug. 1998, p. 1-18.

Nozer D. Singpurwalla, Determining an Optimal Time Interval for Testing and Debugging Software, IEEE Transactions on Software Engineering, vol. 17, No. 4, Apr. 1991, p. 313-319.

Carmen Trammell, Quantifying the Reliability of Software: Statistical Testing Based on a Usage Model, Proceedings of the 2nd IEEE Software Engineering Standards Symposium, 1995, Department of Computer Science, Univerisity of Tennessee, Knoxville, TN, p. 208-218.

Andrew S. Tanenbaum, Distributed Operating Systems, Prentice Hall, Upper Saddle River, New Jersey, p. 245-375.

* cited by examiner

TECHNIQUE FOR HANDLING SERVER SESSION REQUESTS IN A SYSTEM HAVING A PLURALITY OF SERVERS

The present application is a continuation application of U.S. application Ser. No. 10/043,264 filed Jan. 14, 2002, now abandoned, which is a continuation of prior application Ser. No. 09/884,469 filed on Jun. 20, 2001, now abandoned.

FIELD OF THE INVENTION

The present invention relates generally to load balancing and failures in server networks and, more particularly, to a technique for handling server session requests in a system having a plurality of servers.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems (DSS's) have been developed to efficiently retrieve selected information from data warehouses. One type of decision support system is known as an on-line analytical processing system (OLAP). In general, OLAP systems analyze the data from a number of different perspectives and support complex analyses against large input data sets.

There are at least three different types of OLAP architectures: Relational On-Line Analytical Processing (ROLAP), Multidimensional On-Line Analytical Processing (MOLAP) and Hybrid On-Line Analytical Processing (HOLAP) systems. ROLAP systems use a dynamic server connected to a relational database system. MOLAP systems utilize a proprietary multidimensional database (MDDB) to provide OLAP analyses. The main premise of this architecture is that data must be stored multidimensionally to be viewed multidimensionally. HOLAP systems are a hybrid of the other two.

ROLAP is a three-tier, client/server architecture comprising a presentation tier, an application logic tier, and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database (e.g., the data warehouse).

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into standard query language (SQL) execution plans. The SQL is submitted to the relational database for processing, the relational query results are cross-tabulated, and a multidimensional result set is returned to the end user. ROLAP is a fully dynamic architecture capable of utilizing pre-calculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application level table partitioning, aggregate inferencing, denormalization support, and multiple fact table joins.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB system through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times. Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the pre-compiled data, and has limited capabilities to dynamically create aggregations or to calculate business metrics that have not been pre-calculated and stored.

The HOLAP solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL to retrieve the detailed data from a source relational database management system (RDBMS) and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server-side and a module is typically provided at a client-side to enable users to input queries and report requests to the OLAP engine. In some systems, such queries and report requests are directed to a single designated server upon which the OLAP engine resides. Thus, if this single designated server fails, all previously input queries and report requests are typically lost and each user typically has to input new queries and report requests to another single designated server upon which another OLAP engine resides. This can obviously be time consuming and costly.

In other systems, such queries and report requests may be directed to one of several servers, each of which contains an OLAP engine. Typically, a user is assigned to one of these servers based upon a simple sequential scheme (e.g., a round-robin scheme). However, as with the single designated server described above, if any one of these several servers fails, all previously input queries and report requests are typically lost and each user typically has to input new queries and report requests to another one of several servers. Even if none of these several servers fails, there still may be loading problems associated with the servers. That is, some queries and report requests may be significantly more intensive and time consuming than others, and these more intensive and time consuming queries and report requests may be assigned to the same server. Thus, some servers may be overloaded, while other servers may be underutilized. This can obviously be very inefficient.

In view of the foregoing, it would be desirable to provide a technique for processing queries and report requests which overcomes the above-described inadequacies and shortcomings. More particularly, it would be desirable to provide a technique for handling server session requests in a system having a plurality of servers in an efficient and cost effective manner.

SUMMARY OF THE INVENTION

According to the present invention, a technique for handling server session requests in a system having a plurality of servers is provided. In one embodiment, the technique includes receiving a request to create a session on one of the plurality of servers. This request typically originates from a user wanting access to the system. In response to the request, a primary session is created on a first of the plurality of servers. After the primary session is created, at least one other of the plurality of servers are notified that the primary session has been created. Such notification allows for a backup session on the at least one other of the plurality of servers to take over for the primary session upon a failure of the first of the plurality of servers.

In accordance with other aspects of the present invention, the primary session may be beneficially created based upon a variety of techniques. For example, the primary session on the first of the plurality of servers may be beneficially created based upon a pre-defined static distribution scheme. Alternatively, the primary session on the first of the plurality of servers may be beneficially created based upon a relative load on each of the plurality of servers, wherein the relative load on each of the plurality of servers is determined based upon a load metric associated with each of the plurality of servers. The load metric associated with each of the plurality of servers may be beneficially determined in any one of a variety of ways. For example, the load metric associated with each of the plurality of servers may be beneficially determined based upon a number of requests that each of the plurality of servers has serviced over a period of time. Alternatively, the load metric associated with each of the plurality of servers may be beneficially determined based upon a number of report jobs being processed by each of the plurality of servers at a particular point in time. Alternatively still, the load metric associated with each of the plurality of servers may be beneficially determined based upon a number of sessions that are open on each of the plurality of servers at a particular point in time. In still another alternative, the load metric associated with each of the plurality of servers may be beneficially determined based upon currently utilized or available resources on each of the plurality of servers at a particular point in time.

In accordance with further aspects of the present invention, information associated with the operation of the first of the plurality of servers is beneficially synchronized with information associated with the operation of the at least one other of the plurality of servers. Such synchronization is beneficial in the event of a failure in one of the plurality of servers, whereby another server may take over for the failed server based upon the information associated with the operation of the failed server.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Figure 1:
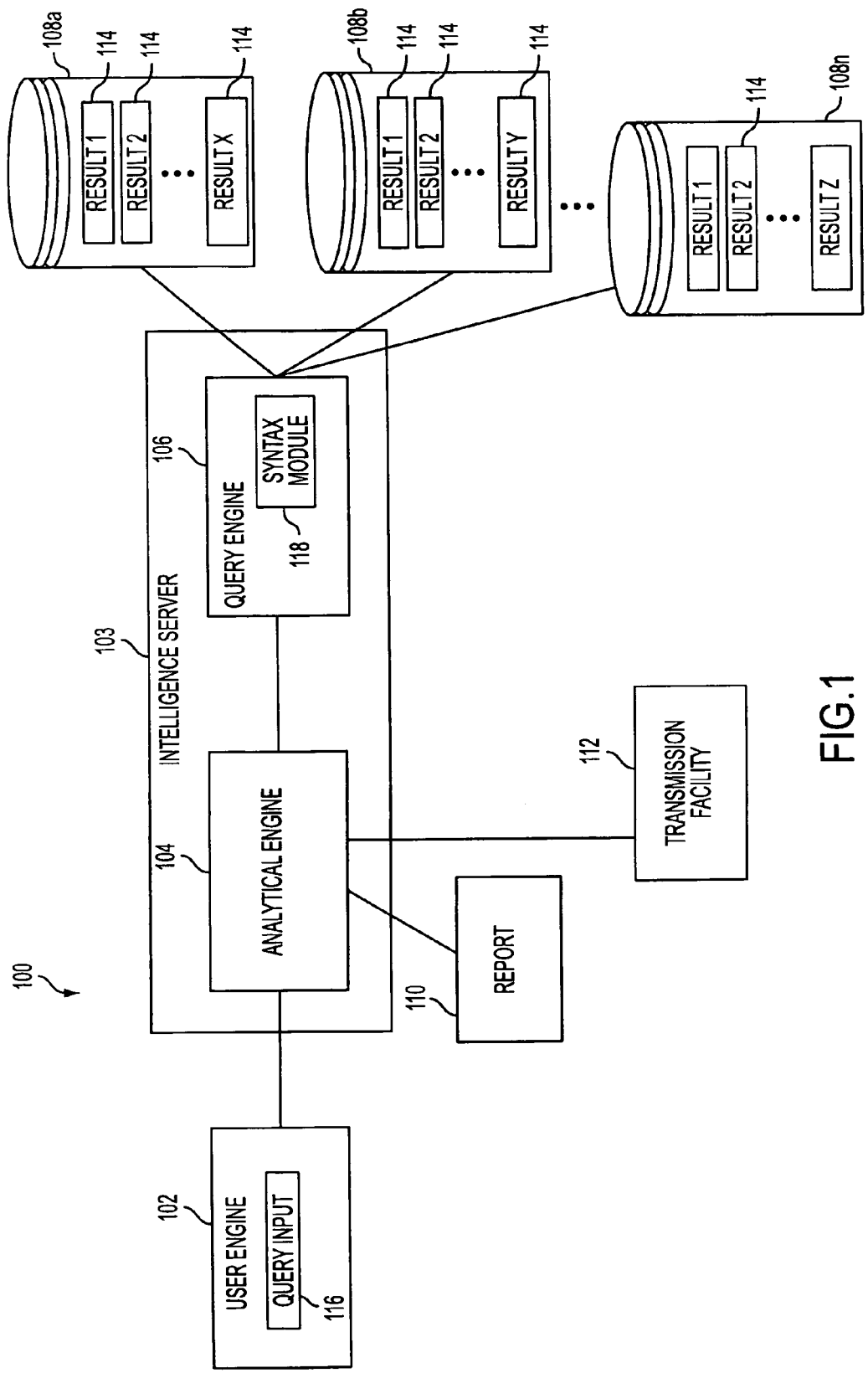
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108*a*, 108*b* . . . 108*n*. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
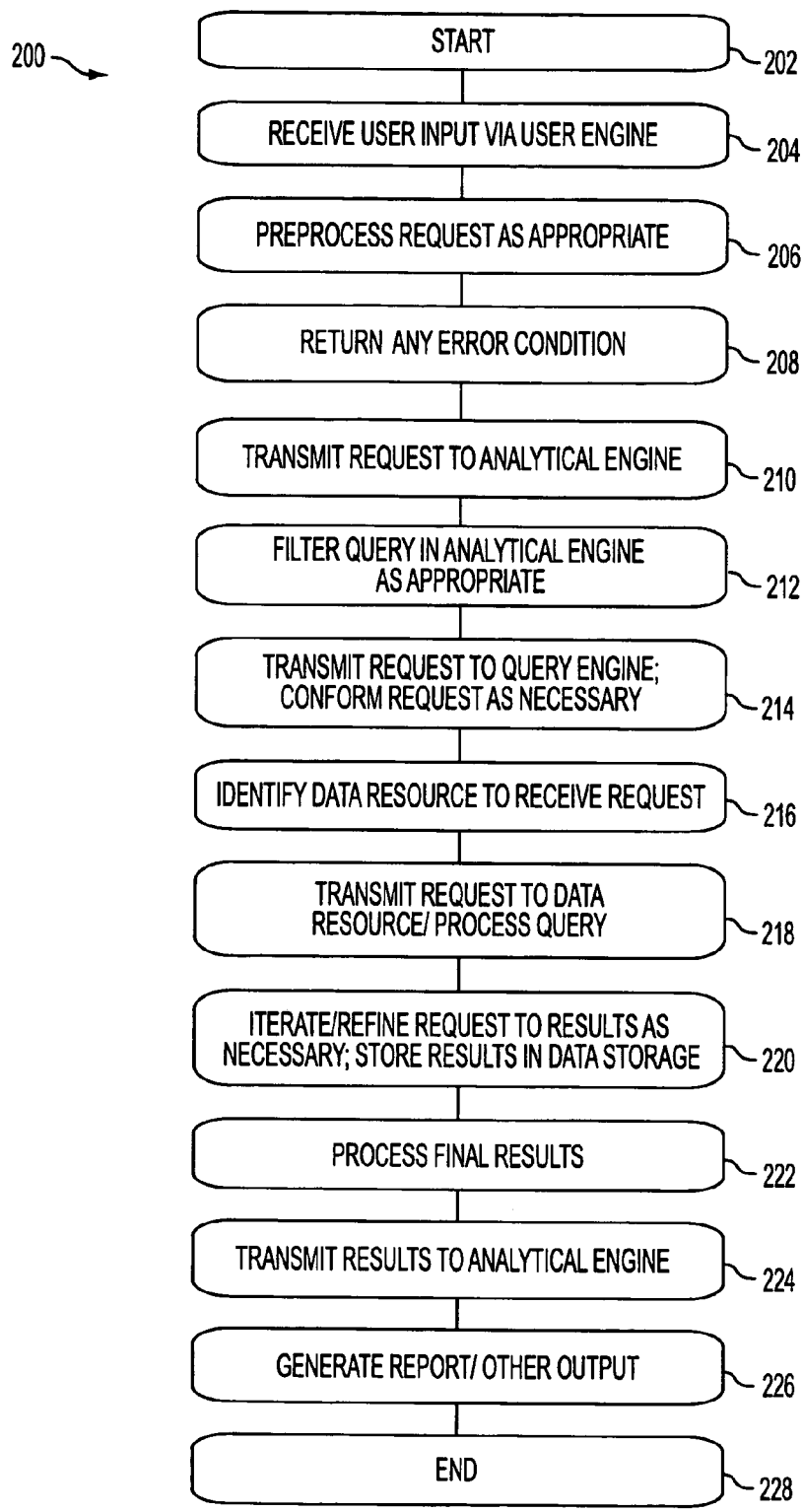
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108*a*, 108*b* . . . 108*n*. In step 216, one or more appropriate databases or other resources within the data storage devices 108*a*, 108*b* . . . 108*n* may be identified to be accessed for the given query.

In step 218, the query may be transmitted to the data storage devices 108*a*, 108*b* . . . 108*n* and the query may be processed for hits or other results 114 against the content of the data storage devices 108*a*, 108*b* . . . 108*n*. In step 220, the results 114 of the query may be refined, and intermediate or other corresponding results 114 may be stored in the data storage devices 108*a*, 108*b* . . . 108*n*. In step 222, the final results 114 of the processing of the query against the data storage devices 108*a*, 108*b* . . . 108*n* may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Figure 3:
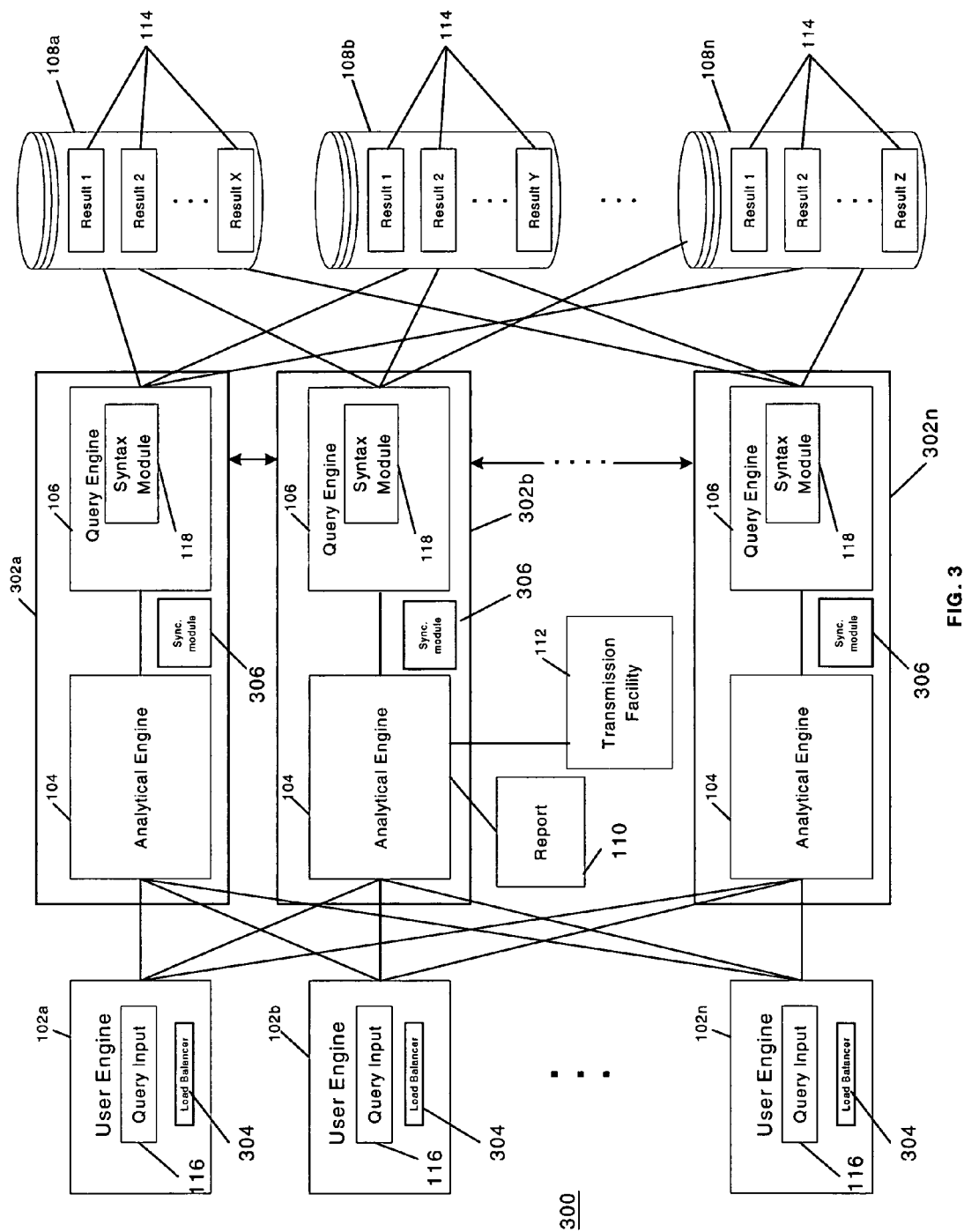
FIG. 3 is a block diagram illustrating a system having a plurality of user engines, a plurality of intelligence servers, and a plurality of data storage devices according to an embodiment of the invention.

In a particular embodiment of the invention illustrated in FIG. 3, a system 300 comprises a plurality of user engines 102, a plurality of intelligence servers 302, and a plurality of data storage devices 108. Each user engine 102 includes a query input module 116 for accepting a plurality of searches, queries, or other requests, as described above. Each user engine 102 also includes a load balancer 304 for determining which of the plurality of intelligence servers 302 should service a session request, as described in detail below.

Each of the plurality of intelligence servers 302 includes an analytical engine 104 and a query engine 106. Each analytical engine 104 processes requests to generate a quantitative report 110, which may be presented to a user at a requesting user engine 102 or transmitted to a respective or common transmission facility 112 for transmission to a set of personnel, as described above. Each query engine 106 communicates with the plurality of data storage devices 108 so as to obtain requested data, as also described above. Each of the plurality of intelligence servers 302 also includes a synchronization module 306 for maintaining synchronization with others of the plurality of intelligence servers 302, as described in detail below. Also, the plurality of intelligence servers 302 are interconnected so as to enable communication therebetween, thereby enabling synchronization to be maintained among all of the plurality of intelligence servers 302, as also described in detail below.

At this point it should be noted that the system 300 shown in FIG. 3 supports multiple users through the plurality of user engines 102 and the plurality of intelligence servers 302.

In order to process requests at an analytical engine 104, a session must first be created on the intelligence server 302 that is associated with that analytical engine 104. A session is created on the intelligence server 302 based upon a request for such a session that is received by the intelligence server 302. Each session request that is received by the intelligence server 302 is typically initially processed by the analytical engine 104 that is associated with the intelligence server 302 so to determine if, in fact, any further requests that are associated with the requested session can and should be processed by the analytical engine 104 that is associated with the intelligence server 302.

The user engine 102 generates each session request based upon a corresponding request made by a user. Each session request that is generated by the user engine 102 is directed to the intelligence server 302 based upon certain criteria described in detail below.

The user engine 102 directs each generated session request to one of the plurality of intelligence servers 302 based upon information that is maintained within the load balancer 304 that is associated with the user engine 102. Such information, which is provided to the load balancer 304 by each of the plurality of intelligence servers 302, generally includes a listing of all of the plurality of intelligence servers 302 that are presently available for servicing session requests, and the present load on each of the plurality of intelligence servers 302 in the listing. Based upon this information that is maintained within the load balancer 304, the user engine 102 may direct each generated session request to one of the plurality of intelligence servers 302 in accordance with several different techniques. For example, the user engine 102 may direct each generated session request to one of the plurality of intelligence servers 302 according to a static distribution technique, whereby generated session requests are distributed to the plurality of intelligence servers 302 according to a predefined static distribution scheme (e.g., a round-robin uniform distribution).

Alternatively, the user engine 102 may direct each generated session request to one of the plurality of intelligence servers 302 according to a so-called "smart" distribution technique, whereby generated session requests are distributed to the plurality of intelligence servers 302 based upon the present relative load on each of the plurality of intelligence servers 302 (e.g., the session request is directed to the intelligence server 302 having the smallest present load). In this "smart" distribution technique, once the session request is directed to the least loaded intelligence server 302, all further requests associated with that session must be serviced by that same intelligence server 302 (e.g., further requests associated with that session cannot be transferred to another intelligence server 302).

Alternatively still, the user engine 102 may direct each generated session request to one of the plurality of intelligence servers 302 according to a dynamic load balancing technique, whereby generated session requests may be distributed to the plurality of intelligence servers 302 based upon either of the above-mentioned techniques (i.e., the static distribution technique or the "smart" distribution technique), but thereafter any further requests associated with a session may be serviced by another intelligence server 302 (e.g., further requests associated with a session can be transferred to another intelligence server 302).

When directing generated session requests to one of the plurality of intelligence servers 302 according to either the "smart" distribution technique or the dynamic load balancing technique (when the dynamic load balancing technique uses the "smart" distribution technique), there are several different metrics that can be used to measure the present load on each of the plurality of intelligence servers 302. For example, the present load on an intelligence server 302 can be based upon the number of requests that the intelligence server 302 has serviced to date. The net effect of this load metric is that session requests are distributed in a round-robin fashion across the plurality of intelligence servers 302. Alternatively, the present load on an intelligence server 302 can be based upon the number of report jobs being processed by the intelligence server 302 at a particular point in time. Alternatively still, the present load on an intelligence server 302 can be based upon the number of sessions that are open on the intelligence server 302 at a particular point in time.

In still another alternative, the present load on an intelligence server 302 can be based upon currently utilized or available resources (e.g., CPU and memory) on each of the plurality of servers 302 at a particular point in time.

At this point, it should be noted that when a session request is directed to a particular one of the plurality of intelligence servers 302, and a session is created on that intelligence server 302, the synchronization module 306 associated with that intelligence server 302 notifies the synchronization modules 306 associated with one or more of the other intelligence servers 302 that this session has been created. This notification is enabled through the interconnection of the plurality of intelligence servers 302. Thus, the synchronization module 306 in each of the plurality of intelligence servers 302 is aware of sessions that have been created on one or more other of the plurality of intelligence servers 302. This feature is particularly important for purposes of failover, as described in detail below.

In addition to notifying other synchronization modules 306 associated with other intelligence servers 302 of the creation of any sessions on a respective intelligence server 302, each synchronization module 306 also maintains synchronization of metadata, reports, and other information regarding the operation of each intelligence server 302. For instance, whenever a change is made to a metadata object in one intelligence server 302, the synchronization module 306 associated with that intelligence server 302 notifies the synchronization modules 306 associated with all of the other intelligence servers 302 that this change has been made so that consistency is maintained throughout all of the plurality of intelligence servers 302. Also, whenever a report is created through one intelligence server 302, the synchronization module 306 associated with that intelligence server 302 notifies the synchronization modules 306 associated with all of the other intelligence servers 302 of the existence of the report so that the other intelligence servers 302 may use the same report. Further, as described above, whenever a session is created on one intelligence server 302, the synchronization module 306 associated with that intelligence server 302 notifies the synchronization modules 306 associated with all of the other intelligence servers 302 of the existence of the session so that one of the other intelligence servers 302 may take over if a failure occurs on the original intelligence server 302. This last scenario is called failover.

Failover is a feature that provides high availability of the plurality of intelligence servers 302. The present invention failover scheme insures that continuous service is provided by at least one of the plurality of intelligence servers 302 in the event of either an application failure or a server failure. An application failure is an abnormal termination of the software on an intelligence server 302 due to some unexpected error or condition in the software. A server failure is a failure of something in the hardware configuration or operating system on which the intelligence server 302 is running.

To be precise, failover is the ability for one intelligence server 302 to take over the workload of another failed intelligence server 302. This is enabled through the use of the synchronization modules 306, which communicate operation information regarding each of the plurality of intelligence servers 302 amongst themselves. Thus, each of the plurality of intelligence servers 302 is aware of the status of each other intelligence server 302, thereby allowing one intelligence server 302 to assume the responsibilities of another failed intelligence server 302.

At this point, it should be noted that the functions associated with the present invention intelligence server session request processing scheme may be implemented in hardware or software. For example, specific electronic components may be employed in a user engine 102 and an intelligence server 302 for implementing the functions associated with the present invention intelligence server session request processing scheme. Alternatively, one or more processors operating in accordance with stored instructions may implement the functions associated with the present invention intelligence server session request processing scheme. If such is the case, it is within the scope of the present invention that such instructions may be transmitted to the user engine 102 and the intelligence server 302 via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for handling a request to create a session on a server in a system having a plurality of servers, the method comprising the steps of:
   receiving a request to create a session on one of the plurality of servers;
   creating a primary session on a first of the plurality of servers in response to the request; and
   notifying at least one other of the plurality of servers that the primary session has been created, such that a backup session on the at least one other of the plurality of servers may take over for the primary session upon a failure on the first of the plurality of servers, wherein the at least one other of the plurality of servers is notified that the primary session has been created prior to failure of the first of the plurality of servers.

2. The method as defined in claim 1, wherein the step of creating the primary session on the first of the plurality of servers includes the step of:
   creating the primary session on the first of the plurality of servers based upon a pre-defined static distribution scheme.

3. The method as defined in claim 1, wherein the step of creating the primary session on the first of the plurality of servers includes the step of:
   creating the primary session on the first of the plurality of servers based upon a relative load on each of the plurality of servers, the relative load on each of the plurality of servers being determined based upon a load metric associated with each of the plurality of servers.

4. The method as defined in claim 3, further comprising the step of:
   determining the load metric associated with each of the plurality of servers based upon a number of requests that each of the plurality of servers has serviced over a period of time.

5. The method as defined in claim 3, further comprising the step of:
   determining the load metric associated with each of the plurality of servers based upon a number of report jobs being processed by each of the plurality of servers at a particular point in time.

6. The method as defined in claim 3, further comprising the step of:
   determining the load metric associated with each of the plurality of servers based upon a number of sessions that are open on each of the plurality of servers at a particular point in time.

7. The method as defined in claim 3, further comprising the step of:
   determining the load metric associated with each of the plurality of servers based upon currently utilized or available resources on each of the plurality of servers at a particular point in time.

8. The method as defined in claim 1, further comprising the step of:
   synchronizing information associated with the operation of the first of the plurality of servers with information associated with the operation of the at least one other of the plurality of servers.

9. A signal embodied in a carrier wave readable by a computing system and encoding a computer program of instructions for executing a computer process performing the method recited in claim 1.

10. A system for handling a request to create a session on a server in a system having a plurality of servers, the system comprising:
    a user engine for receiving a request to create a session on one of the plurality of servers;
    a load balancer for determining a first of the plurality of servers upon which a primary session should be created in response to the request; and
    a synchronization module for notifying at least one other of the plurality of servers that the primary session has been created, such that a backup session on the at least one other of the plurality of servers may take over for the primary session upon a failure on the first of the plurality of servers, wherein the at least one other of the plurality of servers is notified that the primary session has been created prior to failure of the first of the plurality of servers.

11. The system as defined in claim 10, wherein the load balancer determines the first of the plurality of servers upon which the primary session should be created based upon a pre-defined static distribution scheme.

12. The system as defined in claim 10, wherein the load balancer determines the first of the plurality of servers upon which the primary session should be created based upon a relative load on each of the plurality of servers, the relative load on each of the plurality of servers being determined based upon a load metric associated with each of the plurality of servers.

13. The system as defined in claim 12, wherein the load balancer further determines the load metric associated with each of the plurality of servers based upon a number of requests that each of the plurality of servers has serviced over a period of time.

14. The system as defined in claim 12, wherein the load balancer further determines the load metric associated with each of the plurality of servers based upon a number of report jobs being processed by each of the plurality of servers at a particular point in time.

15. The system as defined in claim 12, wherein the load balancer further determines the load metric associated with each of the plurality of servers based upon a number of sessions that are open on each of the plurality of servers at a particular point in time.

16. The system as defined in claim 12, wherein the load balancer further determines the load metric associated with each of the plurality of servers based upon currently utilized or available resources on each of the plurality of servers at a particular point in time.

17. The system as defined in claim 10, wherein the synchronization module synchronizes information associated with the operation of the first of the plurality of servers with information associated with the operation of the at least one other of the plurality of servers.

18. An article of manufacture for handling a request to create a session on a server in a system having a plurality of servers, the article of manufacture comprising:
at least one processor readable carrier; and
instructions carried on the at least one carrier;
wherein the instructions are configured to be readable from the at least one carrier by at least one processor and thereby cause the at least one processor to operate so as to:
receive a request to create a session on one of the plurality of servers;
create a primary session on a first of the plurality of servers in response to the request; and
notify at least one other of the plurality of servers that the primary session has been created, such that a backup session on the at least one other of the plurality of servers may take over for the primary session upon a failure on the first of the plurality of servers, wherein the at least one other of the plurality of servers is notified that the primary session has been created prior to failure of the first of the plurality of servers.

19. The article of manufacture as defined in claim 18, wherein the instructions further cause the at least one processor to operate so as to:
create the primary session on the first of the plurality of servers based upon a pre-defined static distribution scheme.

20. The article of manufacture as defined in claim 18, wherein the instructions further cause the at least one processor to operate so as to:
create the primary session on the first of the plurality of servers based upon a relative load on each of the plurality of servers, the relative load on each of the plurality of servers being determined based upon a load metric associated with each of the plurality of servers.

21. The article of manufacture as defined in claim 20, wherein the instructions further cause the at least one processor to operate so as to:
determine the load metric associated with each of the plurality of servers based upon a number of requests that each of the plurality of servers has serviced over a period of time.

22. The article of manufacture as defined in claim 20, wherein the instructions further cause the at least one processor to operate so as to:
determine the load metric associated with each of the plurality of servers based upon a number of report jobs being processed by each of the plurality of servers at a particular point in time.

23. The article of manufacture as defined in claim 20, wherein the instructions further cause the at least one processor to operate so as to:
determine the load metric associated with each of the plurality of servers based upon a number of sessions that are open on each of the plurality of servers at a particular point in time.

24. The article of manufacture as defined in claim 20, wherein the instructions further cause the at least one processor to operate so as to:
determine the load metric associated with each of the plurality of servers based upon currently utilized or available resources on each of the plurality of servers at a particular point in time.

25. The article of manufacture as defined in claim 18, wherein the instructions further cause the at least one processor to operate so as to:
synchronize information associated with the operation of the first of the plurality of servers with information associated with the operation of the at least one other of the plurality of servers.

* * * * *